United States Patent
Belt et al.

(10) Patent No.: US 7,035,415 B2
(45) Date of Patent: Apr. 25, 2006

(54) METHOD AND DEVICE FOR ACOUSTIC ECHO CANCELLATION COMBINED WITH ADAPTIVE BEAMFORMING

(75) Inventors: Harm Jan Willem Belt, Eindhoven (NL); Cornelis Pieter Janse, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 489 days.

(21) Appl. No.: 09/855,626

(22) Filed: May 15, 2001

(65) Prior Publication Data

US 2002/0015500 A1 Feb. 7, 2002

(30) Foreign Application Priority Data

May 26, 2000 (EP) .................................. 00201881

(51) Int. Cl.
*H04R 3/00* (2006.01)
*H04B 3/20* (2006.01)
*H04M 9/08* (2006.01)

(52) U.S. Cl. .................. 381/92; 381/66; 379/406.01; 379/406.08

(58) Field of Classification Search .................. 381/92
See application file for complete search history.

(56) References Cited

U.S. PATENT DOCUMENTS 6,049,607 A * 4/2000 Marash et al. ......... 379/406.08
6,535,609 B1 * 3/2003 Finn et al. ................... 381/86
6,549,627 B1 * 4/2003 Rasmusson et al. ..... 381/71.11

OTHER PUBLICATIONS

Sven Fisher, Klaus U. Simmer, "Beamforming Microphone Arrays for Speech Acquisitin in Noisy Environments", Feb. 1996, (Abstract).
Walter Kellermann, Strategies for Combining Acoustic Echo Cancellation and Adaptive Beamforming Microphone Arrays, Apr. 1997, (Abstract).

* cited by examiner

*Primary Examiner*—Laura A. Grier
(74) *Attorney, Agent, or Firm*—Larry Liberchuk

(57) ABSTRACT

A method is described, wherein multiple input signals are subjected to a combination process of adaptive beamforming and adaptive echo cancelling, and wherein for each of the input signals an individual processing history of adaptive echo cancelling data is kept and combined with current adaptive beamforming data. Accordingly an audio processing device is described which comprises at least one parallel acoustic paths for providing respective inputs signals, the acoustic paths are connected in series to beamformer paths, and the device comprises an adaptive beamformer and an adaptive echo canceller for performing adaptive beamforming and adaptive echo cancelling respectively, whereby the adaptive echo canceller is provided with storage means for storing in relation to every input signal, individual processing histories of adaptive echo cancelling data for combination with current adaptive beamforming data. Both beamformer and echo cancelling techniques can be combined such that a reduced number of calculations results.

10 Claims, 3 Drawing Sheets

Figure 1:
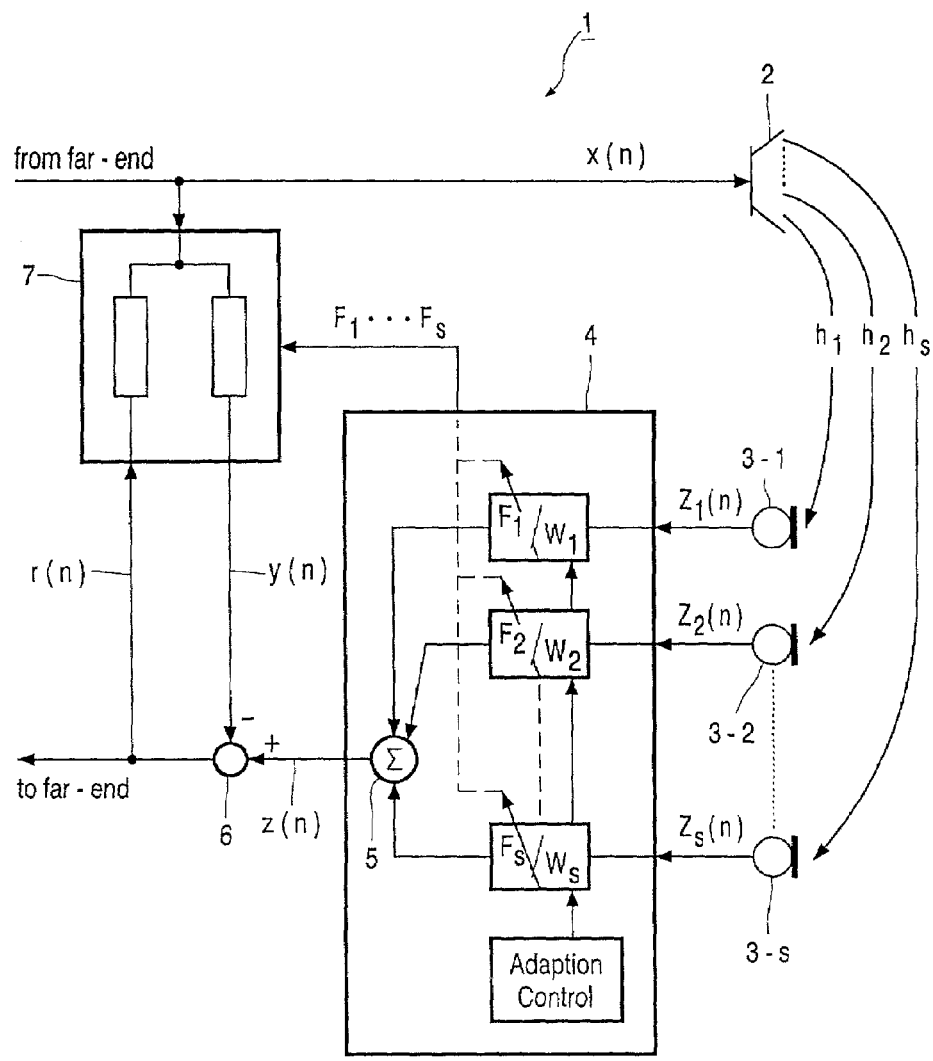

METHOD AND DEVICE FOR ACOUSTIC ECHO CANCELLATION COMBINED WITH ADAPTIVE BEAMFORMING

The present invention relates to a method wherein multiple input signals are subjected to a combination process of adaptive beamforming and adaptive echo cancelling.

The present invention also relates to an audio processing device comprising at least one parallel acoustic path for providing respective inputs signals, the acoustic paths are connected in series to beamformer paths, and comprising an adaptive beamformer and an adaptive echo canceller for performing adaptive echo cancelling; and to a communication device such as found in audio broadcast systems, audio and/or video conferencing systems, speech enhancement, such as in telephone, like mobile telephone systems, speech recognition systems, speaker authentication systems, speech coders and the like, provided with such an audio processing device.

Such a method and devices are known from: 1997 IEEE International Conference on Acoustics, Speech, and Signal Processing, Vol I, Apr. 21–24, 1997, "Strategies for Combining Acoustic Echo Cancellation and Adaptive Beamforming Microphone Arrays" by Walter Kellermann, pp 219–222, Munich, Germany. In particular a strategy is described, wherein a common beamforming method is decomposed into a time-invariant stage followed by a time-variant stage in order to avoid computational complexity and circumvent a time variant beamforming in an acoustic echo cancelling device. As a consequence thereof the known strategy is restricted in its application possibilities. In addition it does not address the fundamental problem of combining the techniques of acoustic echo cancelling and adaptive beamforming, such that both can be applied simultaneously and independently from one another, irrespective the different adaptation time scales involved.

Therefore it is an object of the present invention to provide such a combined echo cancelling and adaptive beamforming method and device, wherein the distinct advantages of both techniques are retained, and wherein the necessary computations, despite the combined techniques are reduced to an acceptable level.

Thereto the method according to the invention is characterized in that for each of the input signals an individual processing history of adaptive echo cancelling data is kept and combined with current adaptive beamforming data.

Accordingly the communication device viz. the audio processing device according to the present invention is characterized in that the adaptive echo canceller is provided with storage means for storing in relation to every input signal, individual processing histories of adaptive echo cancelling data for combination with current adaptive beamforming data.

It is an advantage of the method and device according to the present invention that by storing the processing history of the adaptive echo cancelling data of each input signal individually and by combining this data with current beamformer data the combined use of these data reveals an improved accuracy of the echo cancelling process. In particular updated coefficients of the beamformer, which change faster than the maximum tracking speed of the adaptive acoustic echo cancelling filter, are available for accurately calculating echo cancelling data for each individual input signal. The adaptive echo cancelling filter, which is usually very complex and may contain up to a few thousands coefficients can now be implemented more easily, while the number of necessary calculations is reduced considerably.

An embodiment of the method according to the invention is characterized in that the combined adaptive processing is devised such that each of the respective input signals is running through a parallel path containing an acoustic path and a beamformer path, whereafter signals in the parallel paths are summed and then processed. Accordingly the audio processing device is characterized in that the audio processing device is devised such that each of the respective input signals is running through a parallel path containing an acoustic path and a beamformer path, whereafter signals in the parallel paths are summed and then processed. Advantageously an adaptive echo canceller for performing the adaptive processing only needs to be connected at the summed end of the parallel paths and between the connections to and from the far end of a communication line. Advantageously no separate connections with the individual input paths are necessary, saving processor capacity.

A further embodiment of the method according to the invention is characterized in that adaptive beamforming concerns filtering or weighting of the input signals. The audio processing device is characterized accordingly.

When the adaptations made in the beamformer concern filtering the input signals are filtered such as for example with Finite Impulse Response (FIR) filters, or Infinite Response Filters (IRF) filters. In that case one speaks of a Filtered Sum Beamformer (FSB), whereas in a special case thereof, called a Weighted Sum Beamformer (WSB) the filters are replaced by real gains or attenuations.

A still further embodiment of the audio processing device is characterized in that the adaptive echo canceller comprises a Transform Domain Adaptive Filter, such as for example a Time Domain Adaptive Filter (TDAF), or a Frequency Domain Adaptive Filter (FDAF). Generally FDAF's are preferred in terms of their computational complexity, which shows the additional advantage of a faster convergence if use is made of spectral normalization of its input.

A preferred embodiment of the audio processing device according to the invention is characterized in that the adaptive echo canceller comprises a first section for calculating at least one loudspeaker input spectrum and a part of normalized update data, and a second section for performing convolution and calculating echo cancelling coefficient update data. In a particular embodiment saving a lot of computations specifically if the number of beamformer input signals grows, the second adaptive echo canceller section comprises an adaptive summing filter having an input for receiving beamformer filtering or weighting coefficients, the summing filter comprising the storage means for storing in relation to every input signal, individual processing histories of adaptive echo cancelling data for combination with current adaptive beamforming data.

Figure 2:
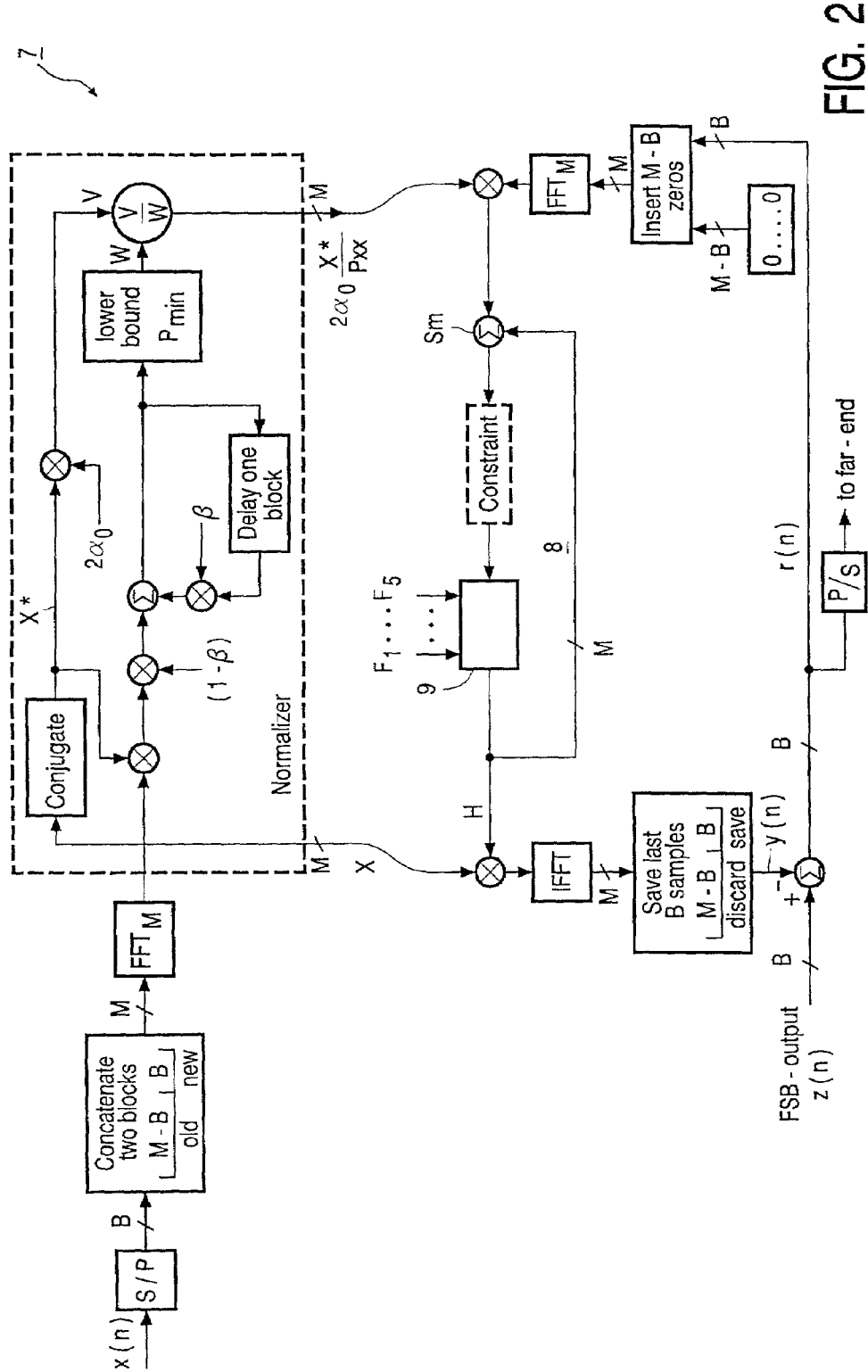
Figure 3:
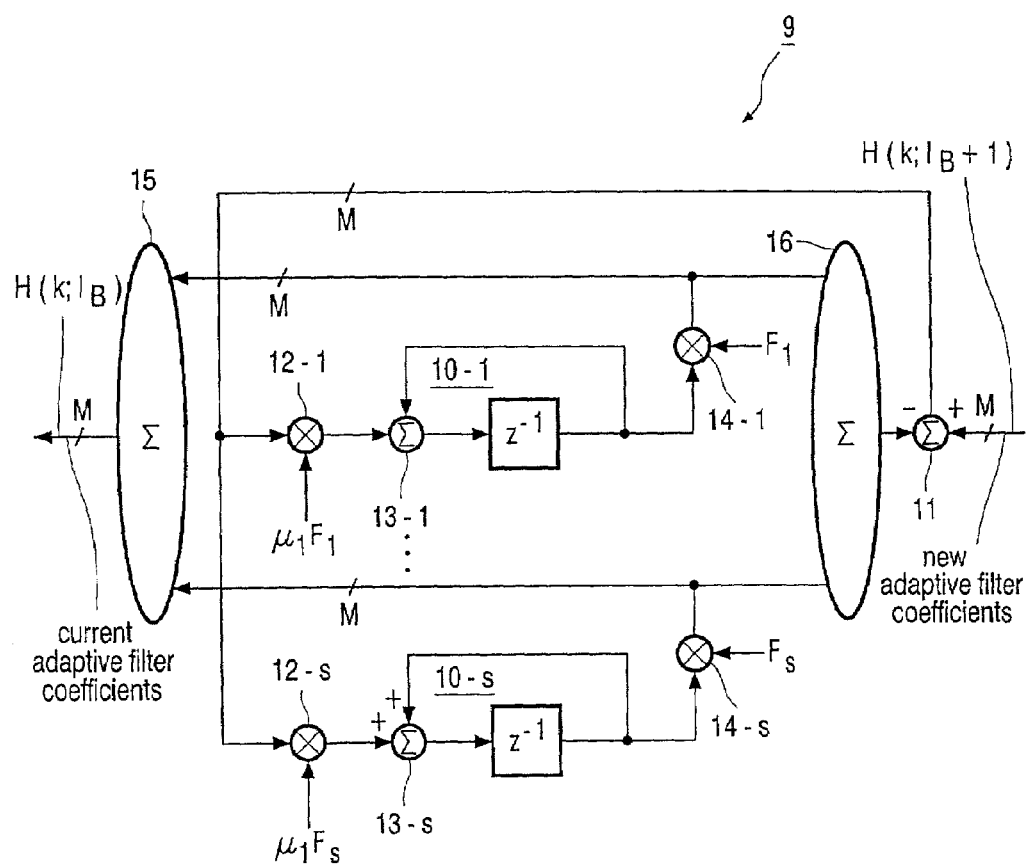

At present the method, audio processing and communication device according to the invention will be elucidated further together with their additional advantages while reference is being made to the appended drawing, wherein similar components are being referred to by means of the same reference numerals. In the drawing:

FIG. 1 shows an embodiment of an audio processing device according to the invention equipped with an adaptive means for acoustic echo cancellation and an adaptive means for beamforming of multiple input signals;

FIG. 2 shows a schematic representation of a preprocessor and a postprocessor part of a Frequency Domain Adaptive Filter (FDAF) implementing the acoustic echo canceller means for application in the audio processing device according to the invention; and FIG. 3 shows an adaptive scheme of an adaptive summing filter for application in the device of FIG. 2, wherein echo cancelling filter coefficients are being stored and updated.

FIG. 1 shows an audio processing device 1 in the form of a communication device comprising a connection to and from a far-end (not shown). The connection from the far-end receives a signal x(n) (n=. . . −1, 0, 1, . . . , n being the sampling index) for a loudspeaker 2 from the device 1. The device 1 may contain more than one loudspeaker 2. The device 1 further comprises a parallel arrangement of microphones 3-1, 3-2, 3-S providing S multiple input signals $z_1(n), z_2(n), \ldots z_S(n)$. These input signals are fed to a beamformer 4. The beamformer 4 may have the form of a so called Filtered Sum Beamformer (FSB), then having filter impulse responses $f_1, f_2, \ldots f_S$, or have the form of a Weighted Sum Beamformer (WSB), which is a FSB whose filters are replaced by real gains or attenuations $w_1, w_2, \ldots w_S$. These responses and gains are continuously subjected to adaptations, that is changes in time. An adaptation control of the beamformer 4 controls this adaptation process. Such beamformer adaptations can for example be made for focussing on a different speaker location, such as known from EP-A-0954850. Adaptations can also be made in order to reduce the overall signal-to-noise ratio. The adapted signals in the beamformer 3 are summed in an internal summing means 5 resulting in output signal z(n), and then fed to an external summing device 6.

The audio processing device 1 further comprises an adaptive echo cancelling means or filter 7 coupled between the far-end connections for performing adaptive echo cancelling. Thereto the instantaneous or current filter responses or gains/attenuations from the adaptive beamformer 4 are fed to the adaptive echo canceller filter 7 for use thereby. Also the far-end input signal x(n) is fed to the filter 7. The filter 7 models respective acoustic paths having acoustic impulse responses $h_1, h_2, \ldots h_S$, while taking the current beamformer coefficients into account and such that an output signal y(n) of the filter 7 is made approximately equal to the echo component of the output signal z(n). The summing device 6 provides an output signal to the far-end which is virtually free of acoustic echoes. The adaptive filter 7 performs a convolution between the signal x(n) and its modelled impulse response model h to reveal the wanted signal y(n). Many algorithms are known in the literature for calculating and adaptively optimizing the filter coefficients h of the adaptive filter 7, which usually is very complicated due to the several thousands of coefficients necessary to implement the adaptive filter 7. The echo cancelling filter 7 can be implemented in any suitable domain in particular for example in the time domain, or the frequency domain. If the device 1 contains more than one loudspeaker then a corresponding number of filters 7 is necessary for compensating that number of echos.

FIG. 2 shows an a schematic representation of a preprocessor (upper) part and a postprocessor (lower) part of a Frequency Domain Adaptive Filter (FDAF) implementing the adaptive filter 7 of the audio processing device 1. In the preprocessor it is schematically shown that the loudspeaker signal x(n) is series-parallel converted (S/P) into blocks containing B samples. Next an array is formed consisting of these B samples preceded by M-B previous samples. Then a real Fast Fourier Transform (FFT) is performed on the last M samples of parallel data leading to the complex frequency spectrum of x(n) denoted by X. The preprocessor also comprises a normalizer calculating the complex conjugate spectrum of X denoted by X* to finally reveal in a way not elucidated further the complex spectrum normalized by its input power spectrum $P_{xx}$. This particular algorithm thus normalized shows a convergence behavior which is independent of the input power.

The postprocessor (lower) part multiplies the complex input spectrum X by the frequency domain FDAF coefficients H and performs an Inverse FFT. The first M-B samples of the result of the IFFT are discarded since these are polluted by cyclic convolution errors. The resulting B samples forming the signal y(n) are subtracted from the newest B samples forming the signal z(n) yielding B samples of a residual signal r(n) fed back to the postprocessor. After parallel series conversion (P/S) this signal r(n) is sent to the far-end. Next the fed back signal is preceded by appropriate zeros, transformed (FFT) to the frequency domain and multiplied by the normalized complex spectrum to give an update term for the FDAF coefficients. Finally the FDAF coefficients are updated with this update term in an update loop 8. The update loop 8 contains a constraint in the time domain, if no programmable filter is used. The constraint prevents cyclic convolution errors to occur. Absence of the constraint saves an FFT and an IFFT for each upgrade. See U.S. Pat. No. 4,903,247, which is considered to be included here by reference thereto.

The update loop 8 contains a building block 9 in the form of an adaptive summing filter, which is elucidated further in FIG. 3. The beamformer coefficients, that is to say the gains, or impulse responses, or their Fourier transforms: $w_1, w_2 \ldots w_S$, or $f_1, f_2 \ldots f_S$, or F1, F2, ... $F_s$ respectively that are constantly adapted by beamformer 4 are supplied to the adaptive filter 7, in particular to the building block 9 as shown in FIG. 2. The building block 9 contains S consecutive loops 10-1, . . . 10-S such that for each of the S input signals an individual processing history of at least adaptive and/or updated adaptive echo cancelling coefficients is stored in delay elements $z^{-1}$ for use during adaptive echo cancelling processing. Summing devices 15 and 16 provide summed current frequency domain FDAF coefficients H(k; $l_B$), wherein k is the frequency band or bin, k=0 . . . M−1, having M frequency domain adaptive filter coefficients, and $1_B$ is the iteration index, which is increased by unity once every B sampling instance. The FFT transformed and normalized residual signal r(n) updates the summed current coefficients in summing device Sm (see FIG. 2) and provides new adaptive filter coefficients H(k;$l_B$+1) to summing device 11 for comparison with the above mentioned summed current FDAF coefficients. In each individual loop 10-1, . . . 10-S the result of this comparison is multiplied in multipliers 12-1, . . . 12-S by $\mu_1(k)F_1(k;l_B)\ldots \mu_1F_S(k;l_B)$, where $\mu_1$ is the stepsize. In summing devices 13-1, . . . 13-S the multiplied results are for each separate signal accumulated. The results in the form of the updated data are stored during the next iteration in the storage/delay elements $z^{-1}$. Then multiplied by $F_1(k;l_B) \ldots F_S(k;l_B)$ in multipliers 14-1, . . . 14-S and summed in the above mentioned two summing devices 15 and 16 respectively. Summarizing it is shown that in this case the combined beamformer and echo cancelling update model kept up to date can be represented by:

$$H_m(k; l_B + 1) = H_m(k; l_B) + \mu_1(k)F_m(k; l_B)\{H(k; l_B + 1) - \sum_{p=1}^{p=S} F_p(k; l_B)H_p(k; l_B)\}$$

for m=0, . . . S, where S represents the total number of beamformer inputs/microphones; k=0, 1, . . . M−1, where there are M frequency domain adaptive filter coefficients at the $l_B$-th iteration, p represents the beamformer input concerned and; wherein further: $1_B$ is the iteration index, which is increased by unity once every B sampling instance; $H_m(k;1_B)$ is the k-th adaptive filter coefficient at the $1_B$-th iteration of the acoustic frequency domain transformed impulse response from the loudspeaker concerned to microphone m (or of beamformer input m);

$\mu_1$ is the stepsize (to be elucidated hereunder);

$F_m(k;1_B)$ is the frequency domain adaptive beamformer filter (gain/attenuation) coefficient of input m in the k-th frequency band, during the $i_B$-th iteration;

$H(k;1_B+1)$ is the updated frequency domain transformed impulse response summed over all inputs (from loudspeaker to beamformer output) in the k-th frequency band, during the $i_B$-th iteration.

A good value for FSB is:

$$\mu_1(k) = 1 \Big/ \sum_{m=1}^{m=S} |F_m(k; 1_B)|^2$$

resulting in $\mu_1(k)=1$ for all k, since the denominator (approximately) equals 1 in the case of an FSB according to EP-A-0954850. Similarly in a special case of FSB, that is WSB one may chose:

$$\mu_1 = 1 \Big/ \sum_{m=1}^{m=S} w_m^2 (1_B)$$

for the same reason resulting in $\mu_1=1$.

Whilst the above has been described with reference to essentially preferred embodiments and best possible modes it will be understood that these embodiments are by no means to be construed as limiting examples of the devices concerned, because various modifications, features and combination of features falling within the scope of the appended claims are now within reach of the skilled person.

The above techniques may be combined with a technique implementing a plurality of loudspeakers, such that building block 9 is present as many times as there are loudspeakers. Stereo echo cancelling can also be applied. In addition a Dynamic Echo Suppressor (DES) may be coupled to the far-end output of the device 1 for providing additional echo suppression.

The invention claimed is:

1. A method comprising multiple input signals subjected to a substantiaous process of adaptive beamforming and adaptive echo cancelling, characterized in that for each of the input signals an individual processing history of adaptive echo cancelling data is kept and combined with current adaptive beamforming data.

2. The method according to claim 1, characterized in that the combined adaptive processing is devised such that each of the respective input signals is running through a parallel path containing an acoustic path and a beamformer path, whereafter signals in the parallel paths are summed and processed.

3. The method according to claim 1 or 2, characterized in that adaptive beamforming concerns filtering or weighting of the input signals.

4. An audio processing device comprising parallel acoustic paths for providing respective input signals, the acoustic paths are connected in series to beamformer paths, the device comprises an adaptive beamformer and an adaptive echo canceller, characterized in that the adaptive echo canceller is provided with storage means for storing in relation to every input signal, individual, processing histories of adaptive echo cancelling data for combination with current adaptive beamforming data, the beamformer and canceller being configured for simultaneously adaptive operation.

5. The audio processing device according to claim 4, characterized in that the audio processing device is devised such that each of the respective input signals is running through a parallel path containing an acoustic path and a beamformer path, whereafter signals in the parallel paths are summed and processed.

6. The audio processing device according to claim 4 or 5, characterized in that the adaptive beamformer is a filtered and/or weighted beamformer.

7. The audio processing device according to claim 4 or 5, characterized in that the adaptive echo canceller comprises a Time Domain Adaptive Filter (TDAF), or a Frequency Domain Adaptive Filter (FDAF).

8. An audio processing device comprising parallel acoustic paths for providing respective input signals, the acoustic paths are connected in series to beamformer paths, the device comprises an adaptive beamformer and an adaptive echo canceller, characterized in that the adaptive echo canceller is provided with storage means for storing in relation to every input signal, individual processing histories of adaptive echo cancelling data for combination with current adaptive beamforming data, characterized in that the adaptive echo canceller comprises a first section for calculating at least one loudspeaker input spectrum and a part of normalized update data, and a second section for performing convolution and calculating echo cancelling coefficient update data.

9. The audio processing device according to claim 8, characterized in that the second section comprises an adaptive summing filter having an input for receiving beamformer filtering or weighting coefficients, the summing filter comprising the storage means for storing in relation to every input signal, individual processing histories of adaptive echo cancelling data for combination with current adaptive beamforming data.

10. A communication device, comprising:
at least one loudspeaker, multiple microphones for providing respective inputs signals, which microphones are coupled to the at least one loudspeaker through acoustic paths, an adaptive beamformer and an adaptive echo canceller, characterized in that the adaptive echo canceller is provided with storage means for storing in relation to every input signal an individual processing history of adaptive echo cancelling data for combination with current adaptive beamforming data, the beamformer and canceller being configured for simultaneously adaptive operation.

* * * * *